INVENTOR.
JOHN B. SLEDGE

INVENTOR.
JOHN B. SLEDGE
BY
Lyon Lyon
ATTORNEYS

United States Patent Office 3,563,631
Patented Feb. 16, 1971

3,563,631
MODIFIED ELECTRO-OPTIC KERR CELL
John B. Sledge, Los Angeles, Calif., assignor to Metro-Goldwyn-Mayer, Inc., Culver City, Calif., a corporation of Delaware
Filed Nov. 25, 1968, Ser. No. 778,495
Int. Cl. G02b 5/30
U.S. Cl. 350—150
9 Claims

ABSTRACT OF THE DISCLOSURE

An electro-optical cell in which a pair of plates or electrodes are bent or twisted 90° so that their orientation at the exit face of the cell is perpendicular to their orientation at the entrance face of the cell. The cell is filled with a gel made up of nitrobenzene and methacrylate. A display screen or matrix made up of a plurality of such cells addressed on the horizontal and vertical axes by cathode ray tubes is also disclosed.

BACKGROUND OF THE INVENTION

Electro-optical cells such as Kerr cells have been used for many years as light valves or shutters and for various other purposes. These cells are typically constructed of a suitable container provided with a pair of parallel electrodes and filled with a suitable doubly refracting liquid, usually nitrobenzene. When an electric field of suitable strength is applied across the electrodes, the liquid becomes doubly refracting and the plane of polarization of light travelling through the cell will be rotated approximately 90°. By positioning a polarizer before the entrance face of the cell and an analyzer after the exit face of the cell, the passage of light through the cell can be controlled by controlling the electric field. Generally, the polarizer is arranged with its plane of polarization at a 45° angle with the electrodes or plates, and the analyzer has its plane of polarization at 90° to that of the polarizer. One use to which such cells have been put is the fabrication of a matrix of many such cells with various means provided for addressing the rows and columns of the matrix so that a field is applied across the cell located at a desired intersection in the matrix.

SUMMARY OF THE INVENTION

According to the present invention, an electro-optical cell is provided which has improved light transmitting characteristics both as far as intensity and chromanance content are concerned. Moreover, the cell is more efficient and rugged than previously known cells in that a less intense field will result in a greater light transmission. These advantages are achieved by providing a cell in which the plates or electrodes are twisted or bent through 90° so that the plates are oriented at the exit face at an angle of 90° with their orientation at the entrance face. With such a construction, it appears that part of the light is actually rotated through 90°, that is, it follows the orientation of the plates. In order to obtain greater ruggedness and improved transmission characteristics, the cell is filled with a gel formed of nitrobenzene and a methacrylate. The viscosity of this gel obviates the thermal agitation problems present in conventional Kerr cells and also makes the cell more rugged and reliable. The gel is less yellow than pure nitrobenzene and therefore transmits more of the visible spectrum, an important consideration in multi-color displays.

The construction of the cell also greatly facilitates its use in a matrix display system as the plates of the cell can be split so as to enable them to be addressed by a pair of cathode ray beams travelling along the X and Y axes of the matrix without intervening switching equipment.

It is therefore an object of the present invention to provide an improved electro-optical cell.

DESCRIPTION OF THE INVENTION

Figure 1:
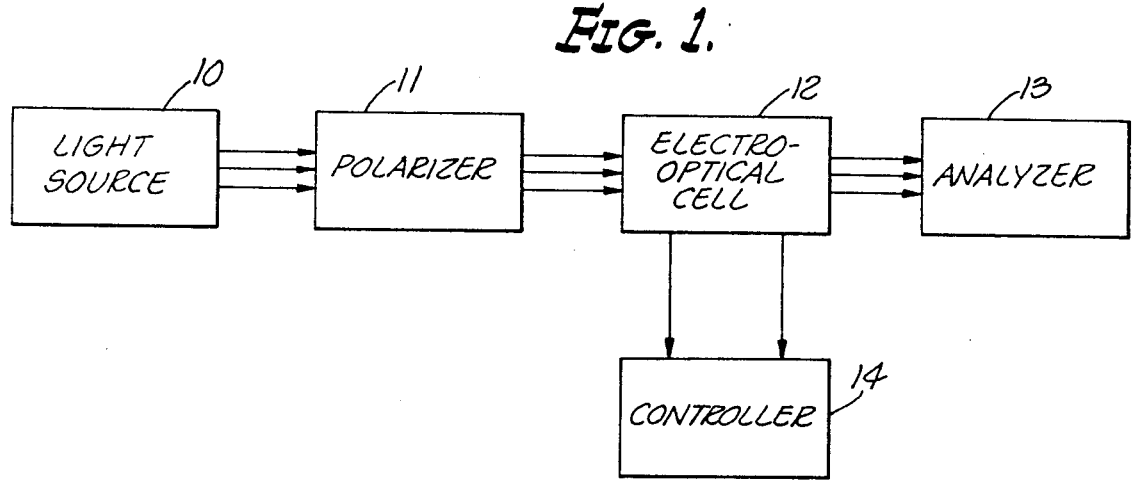
FIG. 1 is a schematic diagram of a typical light valve system utilizing an electro-optical cell.

In FIG. 1 there is shown a typical light valve or modulator system incorporating an electro-optical cell which in the past has typically been a Kerr cell. A source of light 10 directs a beam of light through a polarizer 11 into an electro-optical cell 12. An analyzer 13 is positioned adjacent the exit surface of the cell 12. A controller 14 is provided to establish an electrical potential across the plates of the cell 12 so that an electric field is impressed across the medium within the cell 12 to make it doubly refractive. Normally, in the conventional system, the plane of polarization of the polarizer 11 will be arranged at a 45° angle with the plates of the cell 12 while the plane of polarization of the analyzer 13 will be at an angle of 90° with that of the polarizer. As is well known, in the absence of a field across the plates of the cell 12, light is effectively blocked by the crossed polarizing elements. When a sufficient potential is applied to the plates of the cell, the filler material becomes doubly refracting, which is to say that the light travels along two optical axes, one perpendicular and the other parallel to the plates. On emerging from the cell, these two components combine in a resultant motion which is electrically polarized light with its principal axis in the plane of the analyzer. Much of the entering light is therefore passed through the analyzer.

Figure 2:
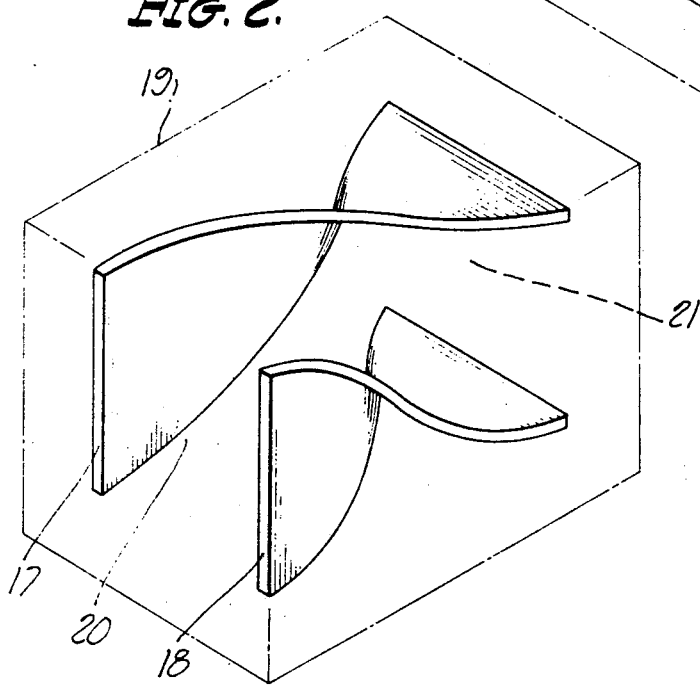
FIG. 2 is a perspective view of a first embodiment of the electro-optical cell of the present invention.

FIG. 2 shows an electro-optical cell that is suitable for use in the light valve system shown in FIG. 1 in place of a conventional Kerr cell. In the cell of FIG. 2, a pair of plates 17 and 18 are positioned within a suitable container 19 having transparent entrance and exit faces 20 and 21. Instead of the plates 17 and 18 being flat and parallel as in the conventional Kerr cell, the plates are twisted through a quarter turn, or 90°, so that the ends of the plates adjacent the entrance face 20 are vertical while the ends of the plates adjoining the exit face 21 are horizontal. Of course, the plates could equally well be reversed, that is, they could be horizontal at the entrance face and vertical at the exit face or could be at any angle between the horizontal and vertical.

With the plates formed in the manner shown in FIG. 2, it has been found that the voltage necessary for passing a given amount of light is considerably less than the calculated value for a conventional Kerr cell. Furthermore, the maximum light transmission is obtained with the cell of FIG. 2 when the planes of the polarizer and analyzer are parallel and perpendicular to the exit and entrance planes of the plates whereas with the usual Kerr cell the angle must be 45° for a maximum effect. While the phenomena underlying the operation of the cell is not completely understood, the evidence indicates that in the quarter twist cell shown in FIG. 2, part of the light, the amount depending on the electric field strength, is actually rotated through 90° in contrast to the apparent rotation in the Kerr cell which is the result of elliptically polarized light with its major axis in the plane of the analyzer. This would explain why the quarter twist plates are more efficient; roughly speaking, a plane fits the exit "slit" of the analyzer better than an ellipse does.

The aforementioned advantages of the quarter twist cell can be enhanced by using as a filler medium a gel composed of nitrobenzene and polymethylmethacrylate instead of pure nitrobenzene as is conventional. It has always in the past been believed that mixing nitrobenzene with almost any impurity seriously impairs the action of the nitrobenzene in a Kerr cell and that only the highly purified chemical can be used. It has been found, however, that nitrobenzene can be successfully mixed with polymethylmethacrylate and polyethylmethacrylate in ratios up to 20% of nitrobenzene and 80% of the methacrylate. When the acrylic monomer and nitrobenzene are mixed and the monomers polymerized with a catalyst the result is a pale yellow, viscous gel. This gel is 80% less yellow than the pure nitrobenzene and therefore transmits almost all of the visible spectrum, and its viscosity obviates the thermal agitation problems usually present in a Kerr cell. In addition, the increased dielectric strength of the cell greatly reduces conduction currents. Furthermore, my investigations indicate that the methacrylate somehow enhances the efficiency of the cell, that is, the voltage required to rotate the beam 90° should be considerably greater for a 20% solution than for a pure nitrobenzene but it is not. This seems to indicate that the entire nitrobenzene-methacrylate system becomes doubly refracting in an electric field although it has been determined that a methacrylate gel alone is electro-optically inactive. It should be understood that the use of this gel enhances the operation of a conventional Kerr cell as well as the cell shown in FIG. 2.

As mentioned previously, it does not appear that the principle of operation of the quarter twist electro-optical cell of the present invention is similar to that of conventional electro-optical or magneto-optical modulators. Prior devices depend on the compounding of two linearly or circularly polarized components produced by a medium made doubly refractive by the application of an electrical or magnetic field so that the resultant light is plane or elliptically polarized light with its plane of polarization on emergence from the device changed from that of the entering light. Such an effect depends on a phase difference between the components transmitted along two axes and this phase difference will be optimal for only one wavelength under a given set of circumstances. This means that when white light is modulated, the light passing through the analyzer will have a color that varies with the applied field. The color is most pronounced in the Faraday cell from which the emerging light is linearly polarized and less so in the Kerr cell from which the emerging light is elliptically polarized so that several wavelengths more or less "fit" the polarization plane of the analyzer at a given voltage.

The cell of the present invention does not divide the entering light into its two components since the light enters with its plane of polarization parallel to an optical axis and is actually rotated by a field-induced spiral rotation of the optical axis along the length of the cell. Since the action of the quarter twist cell is not based on phase difference it is independent of wavelength. This makes it possible to modulate the intensity of white light without color change. Furthermore, the emerging light will be linearly polarized thereby providing a precise fit for optimum transmission through the analyzer.

Figure 3:
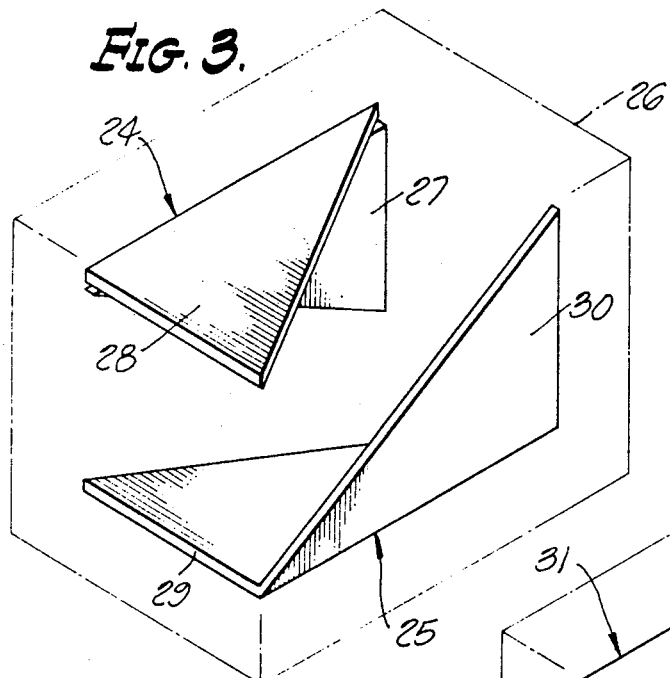
FIG. 3 is a perspective view of a second embodiment of the electro-optical cell of the present invention.

Turning now to FIG. 3, there is shown a cell which is the rectilinear equivalent of the quarter twist cell of FIG. 2. The cell of FIG. 3 again comprises a pair of plates 24 and 25 positioned within a suitable enclosure shown in phantom at 26. However, the plates 24 and 25 are not twisted but rather take the form of a pair of right triangles having their bases at opposite ends of the cell and being connected along their Y axes, the plate segments 27 and 28 being at right angles. The same is true of the plates 29 and 30 of the plate 25. It will be noted that with the cell of FIG. 3, the decrease in the horizontal component of the field between the plates 24 and 25 is accompanied by a proportional increase in the vertical component as the light passes along the length of the cell. This is a good analogy to what happens with true quarter twist plates such as those shown in FIG. 2. Since this geometry can be achieved by depositing a conductive coating pattern on flat, interlocking substrate elements, it simplifies the fabrication of the cell.

The cell of FIG. 3 provides an additional advantage that is of importance when a plurality of cells are to be arranged in a matrix. One of the problems with any display matrix that is addressed by an electron beam on both the X and Y axes is that on one axis the electron beam, being inherently negative, must in some way be used indirectly to establish a maximum potential difference at the addressed intersection. This means that one beam must, for example, be used to gate a solid state device, or trigger an ionization discharge device; and there must be one electrically isolated device for each line on the axis. Several such systems are disclosed in my copending application Ser. No. 557,826 entitled "Matrix Display Screen" filed on June 15, 1966, now abandoned, the disclosure of which is incorporated by reference herein.

The cell shown in FIG. 3 permits the electron beams to be used directly without any intermediary switching devices or the like. Consider what would be the effect of permanently grounding one plate in a conventional Kerr cell and having the other plate in a plane parallel to the entrance and exit faces so that one half of the segmented plate could be addressed on the X axis and the other on the Y axis. It is obvious that the cooperative effect of the two addresses would establish the maximum Kerr effect at the point of intersection in the matrix since a single axis address would reduce the effective path length in the cell by one half. The formula describing the Kerr effect indicates that 0.7 of the light intensity from a two-centimeter cell would be transmitted through the analyzer by a one-centimeter cell at a given voltage. For each address point we would therefore have an intersecting row and file transmitting 0.7 of the light transmitted by the intersection with the rest of the screen at minimum transmission. This would not be satisfactory because of the high level of unwanted background illumination.

The situation with the quarter twist plates shown in FIG. 2 segmented in the same way would be somewhat better because the angle of twist in one half the cell is only 45°, in addition to the path lengths being reduced by one half. This would result in the halved cell transmitting a calculated 0.35 of the intensity of the light transmitted by the entire cell at a given voltage. But even this would severely reduce the contrast possible in the display.

However, consider the situation of the cell in FIG. 3 if the plate 24 is segmented and the segments 27 and 28 electrically insulated from each other while the plate segments 29 and 30 are electrically connected to ground. With either half of the segmented plate 24 addressed there is a deficiency of either the horizontal or the vertical field component needed for the quarter twist and no rotation of the optical axis will occur. If, however, both segments 27 and 28 are addressed, the necessary quarter twist will be present and rotation of the optical axis will occur. The cell of FIG. 3 could thus be used in a direct beam address system that gates light transmission only at the intersection of the two address axes.

Figure 4:
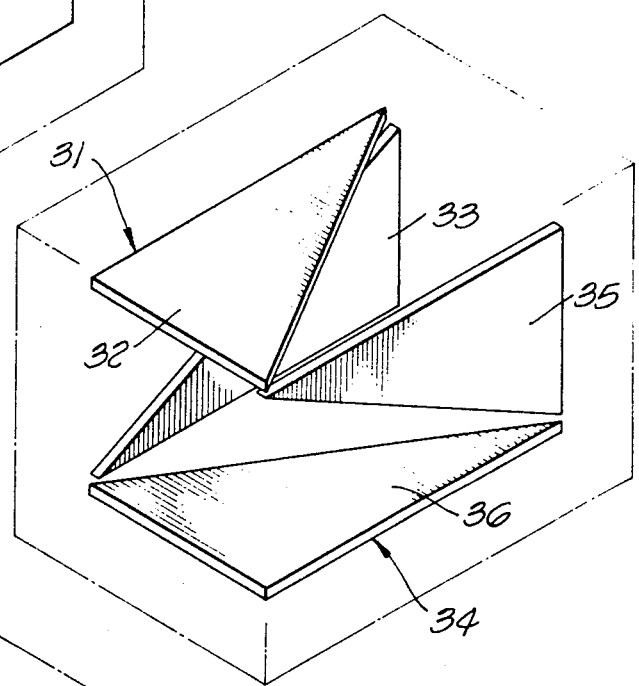
FIG. 4 is a perspective view of a third embodiment of an electro-optical cell according to the present invention.

FIG. 4 illustrates another embodiment of the invention which corresponds to that shown in FIG. 3 but with a wider separation of plate sections. Thus, one plate 31 is divided into triangular segments 32 and 33 while the other plate 34 is divided into triangular segments 35 and 36. The segments are oppositely disposed, the base of one segment being adjacent the apex of the other. This plate orientation requires the cooperative action of all four segments in order to obtain any electro-optical effect. The segments of one of the plates could be insulated from each other in the manner described in connection with FIG. 3 to adapt this cell for use in a matrix system.

Figure 5:
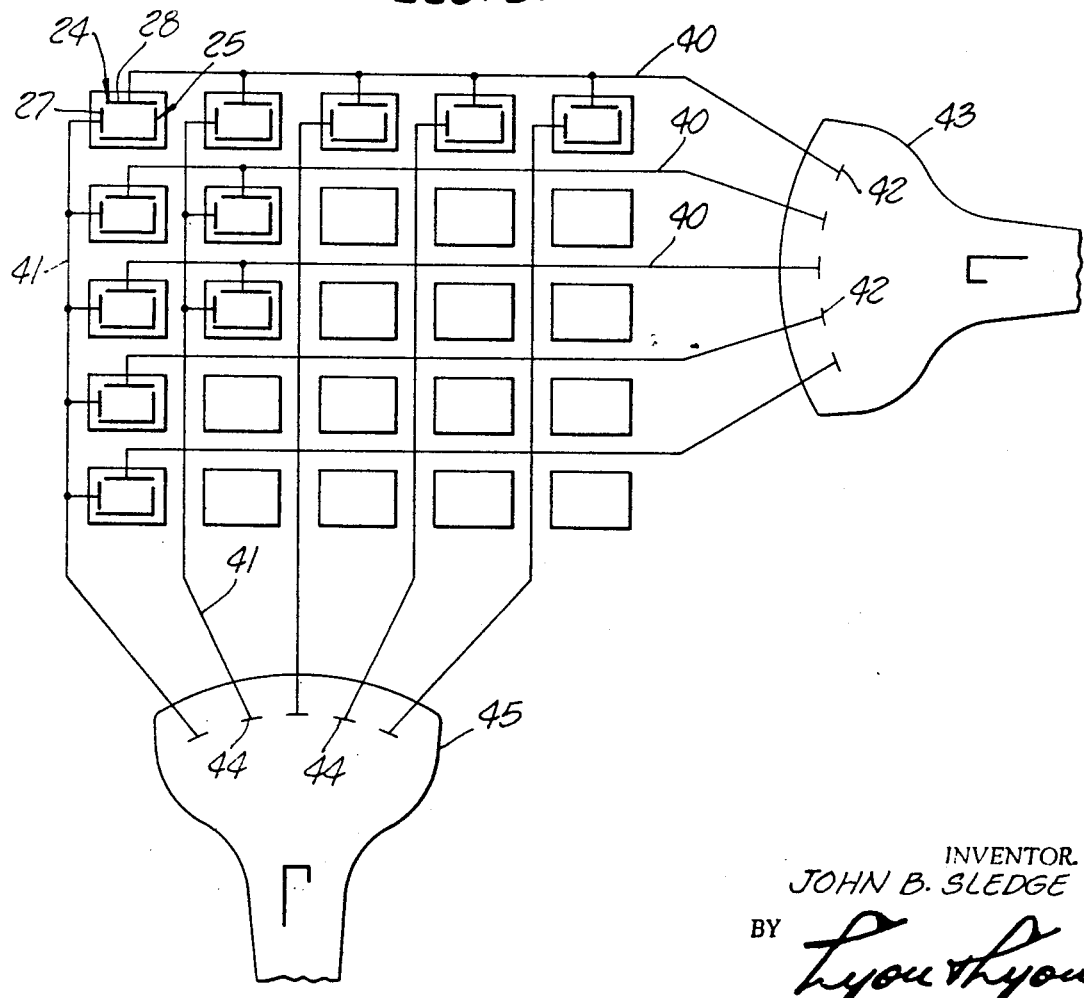
FIG. 5 is a schematic diagram illustrating a matrix constructed of a plurality of the cells shown in FIG. 4.

FIG. 5 shows in schematic fashion a matrix made up of cells such as those shown in FIG. 3. As can be seen, the plate sections 28 of all of the cells in a single row are tied to one of a plurality of electrical conductors 40 while all of the plate segments 27 in a single column are tied to one of a plurality of electrical conductors 41. The conductors 40 each terminate in a target 42 in a cathode ray tube 43 while the conductors 41 each terminate in a target 44 in a cathode ray tube 45. The various targets 42 and 44 can be scanned by the electron beam of the tubes 43 and 45 to establish the particular intersection at the matrix where illumination is desired. It should be understood that the address system including the tubes 43 and 45 is only schematically shown and that any suitable means for addressing the horizontal and vertical conductors with an electron beam could equally well be used. It should also be understood that the plates 25 of each of the cells is held at a potential higher than that of the electron beams, preferably at ground potential, although such connections are not shown for the sake of clarity. Luminance modulation of the segmented rectilinear cells can be achieved by current or velocity modulation of the two switching beams or by modulating the voltage or resistance to ground of the positive unsegmented plates. The matrix would be particularly suitable for use as a television receiver in which case the plates would be ganged into two separate fields for interlace and the modulators would be conventional vacuum tube or solid state devices.

The rectilinear quarter twist cells such as those shown in FIGS. 3 and 4 should be square rather than rectangular in cross-section, otherwise the horizontal or vertical components of the field will be unequal in strength because of the unequal plate separation. While this might be compensated for in the voltage of the two scanning beams, a square cross-section is obviously the best in geometry choice.

The invention may be embodied in other specific forms not departing from the spirit of central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electro-optical cell comprising a container having an entrance face and an exit face, a pair of plates positioned in said container, said plates being oriented at said exit face at an angle of substantially 90° with their orientation at said entrance face, and a body of material positioned in said container between said plates, said material being capable of becoming doubly refractive when subjected to an electric field.

2. The cell of claim 1 wherein said plates are twisted to form said 90° angle.

3. The cell of claim 1 wherein said plates each comprise a pair of triangular segments arranged to form said 90° angle therebetween.

4. The cell of claim 3 wherein said triangular segments are adjacent along one edge to form said 90° angle, the bases of said triangular segments being at opposite faces of said cell.

5. The cell of claim 3 wherein said triangular segments are oppositely disposed, the base of one segment being adjacent the apex of the other.

6. The cell of claim 4 wherein the segments of at least one of said plates are electrically insulated from each other.

7. The cell of claim 5 wherein the segments of at least one of said plates are electrically insulated from each other.

8. The cell of claim 1 wherein said material comprises nitrobenzene and methacrylate.

9. The cell of claim 8 wherein said material comprises a gel of nitrobenzene and polymethylmethacrylate.

References Cited

UNITED STATES PATENTS 2,163,551    6/1939    Clothier et al.

DAVID SCHONBERG, Primary Examiner

P. R. MILLER, Assistant Examiner